Nov. 12, 1946.   T. L. CALLAHAN ET AL   2,410,927
BEARING AND SEAL CONSTRUCTION
Filed May 17, 1943
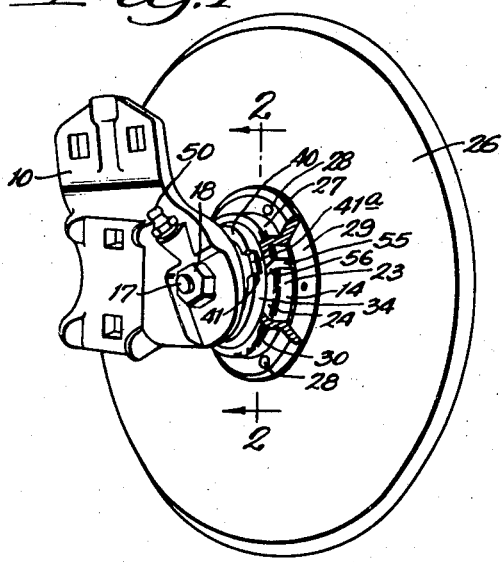
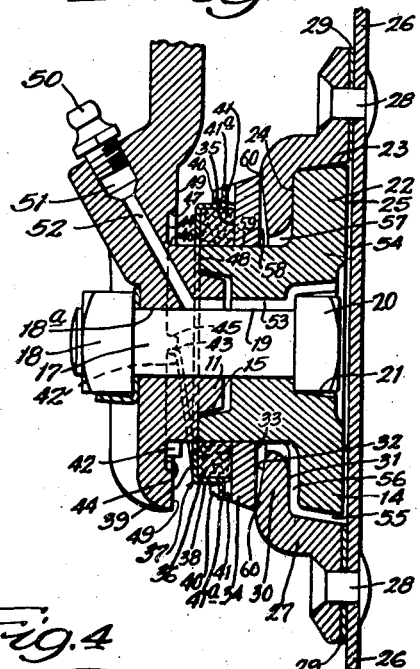
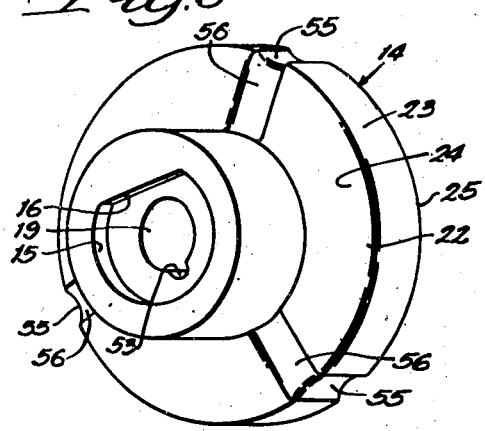
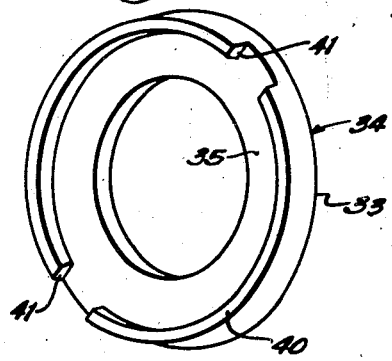
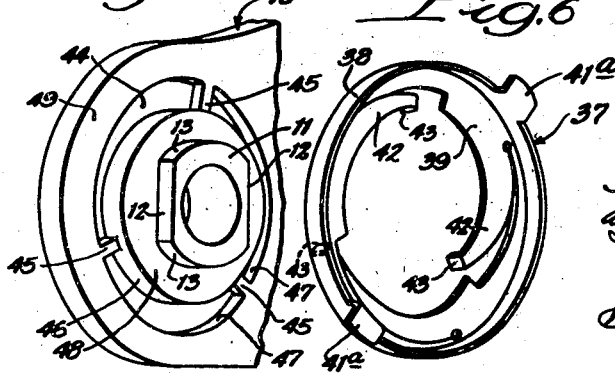
Inventors:
Thomas L. Callahan
and Jay Weaver,
By Paul O. Pippel
Attorney.

Patented Nov. 12, 1946

2,410,927

UNITED STATES PATENT OFFICE 2,410,927

BEARING AND SEAL CONSTRUCTION

Thomas L. Callahan and Jay Weaver, Richmond, Ind., assignors to International Harvester Company, a corporation of New Jersey Application May 17, 1943, Serial No. 487,224

3 Claims. (Cl. 308—19)

This invention relates to a seal construction. More specifically it relates to the application of such a construction to a furrow opener.

It is a considerable problem to keep dirt and other extraneous matter out of the bearing of a furrow opener, since the furrow opener normally runs in the ground. A very efficient sealing of the bearing is required. On the other hand, it is known, though perhaps not in the case of furrow openers, to provide a seal construction involving a seal against which another rotating metal part slides, and a yielding seal of rubber or absorbent material, which is saved from wear because it contacts only stationary parts. The entire wear in the seal construction is assumed by the metal seal. One of the difficulties with an arrangement of this sort is that the variation in the direction of force applied by the rotating metal part to the metal seal will cause the metal seal to tilt with respect to the supporting structure and locking lugs thereof for holding the metal seal against rotation. The result is wear between the locking lugs and the parts of the metal seal it contacts. Furthermore, the rotational force tending to turn the metal seal causes the seal to tilt around the locking lugs and so to create a gap for dust to enter. Another disadvantage is that the yielding seal, though not in contact with rotating parts, may be moved so that its sealing efficiency is seriously affected. The present application has to do with improvements in this type of seal construction and the applying of such a construction to a furrow opener.

An object of the present invention is to provide an improved seal construction.

A further object is to improve a seal construction comprising a metal seal having sliding contact with a rotating part and a resilient seal contacting only stationary parts.

Another object is the provision of an improved seal construction for the furrow opener.

Still another object is to provide a furrow opener with a seal construction involving a metal seal and a resilient seal.

Other objects will appear from the disclosure.

According to the present invention, a member secured to a disk furrow opener rotates in sliding sealing contact with a stationary metallic seal. The member secured to the disk furrow opener is dished so that there is provided between the contacting faces of the member and the metal seal a space for lubricant extending outwardly to a narrow region of contact between these parts. In engagement with the metal seal is a resilient seal, which is held in a retaining member having integral pieces extending therefrom into engagement with a support for the furrow opener in such a manner as to hold the resilient seal against lateral movement and to urge the metal seal member against the rotating member secured to the disk furrow opener. The metal seal is locked to the retaining member so that relative rotation between these parts is prevented.

In the drawing:

Figure 1 is a perspective view with parts removed of the novel seal construction of the present invention applied to a disk opener;

Figure 2 is a sectional view taken along the line 2—2 of Figure 1;

Figure 3 is a perspective view of a member that serves as a bearing support for the disk opener;

Figure 4 is a perspective view of a stationary metal seal;

Figure 5 is a perspective view of a portion of a support to which the bearing support for the disk opener is attached; and Figure 6 is a perspective view of a retaining member.

Reference character 10 indicates a support depending from a carrying frame, not shown. The depending support 10 has a boss 11 projecting therefrom and as shown in Figure 5 having opposite flat sides 12 and connecting arcuate sides 13. A bearing support 14 engages the support 10, receiving the boss 11 in a recess, which is circular except for a flat side 16. The flat side 16 of the recess 15 engages one flat side 12 of the boss 11 and thus prevents relative rotation between the bearing support 14 and the depending support 10. A bolt 17 and a nut 18 secure the bearing support 14 upon the depending support 10, the bolt 17 extending through an opening 18ª in the depending support 10 and an opening 19 in the bearing support 14, and a head 20 of the bolt 17 resting within an enlarged portion 21 of the opening 19. The bearing support 14 has a radial bearing flange 22 having a frusto-conical outer surface 23 and flat end surfaces 24 and 25. A disk furrow opener 26, positioned adjacent the end surface 25 of the radial flange 22 of the supporting member 14, is journaled on the bearing support 14 by means of a rotatable metal member 27 secured to the disk 26 by rivets 28. A gasket 29 spaces the member 27 and the disk 26. The member 27 has an inwardly directed radial flange 30 having one flat end face 31 in engagement with the flat end surface 24 of the bearing flange 22 of the bearing support 14 and another end face 32 which is dished. Engaging the dished face 32 of the rotatable bearing member 27 is a flat end face 33 of a metal seal 34. A second end face 35 of the metal seal 34 is engaged by a packing or sealing member 36 of suitable material, such as felt or rubber. The seal 36 is partially embraced and retained in a cupped retaining member 37 having a circular side portion 38 and a flat end portion 39. The metal seal 34 has at the end face 35 a flange 40 having diametrically opposed notches 41, which receive outwardly extending projections 41ª on the retaining member 37.

As shown in Figure 6, the retaining member 37 has pieces 42 struck from the flat end portion 39 and extending at a slight angle thereto (or at a small angle to a plane transverse to the axis of rotation) and terminating in end portions 43 extending at right angles to the flat end portion 39 of the retainer 37. As seen in Figure 5, the depending support 10 is provided with a groove 44 and three ribs 45 extending across the groove 44. The groove 44 has an inner side 46 which extends a greater distance from the base of the groove than does an outer side 47 of the groove so that there is provided a surface 48 inwardly of the groove 44 and outwardly of the boss 11 higher than a surface 49 outwardly of the groove 44. The diameter of the inner side 46 of the groove 44 is slightly larger than the diameter of a circle determined by the portions 43 on the pieces 42 struck from the end surface 39 of the retainer 37 so that the pieces 42 are sprung outwardly as the end portions 43 are inserted into the groove 44 and the end portions 43 grip the inner side 46 of the groove 44. The gripping of the inner side 46 of the groove 44 by the end portions 43 causes the retaining member 37 to be secured to the depending support 10 in such a manner that movement of the retaining member 37 transverse to the axis of rotation of the disk 26 is prevented. This also prevents a similar transverse movement of the sealing member 36 for a purpose to be described presently.

The retaining member 37 may move angularly with respect to the depending support 10 but only to the extent permitted by the projections 45 in the groove 44. After a certain angular movement, the end portions 43 on the pieces 42 contact the projections 45, and further angular movement is prevented. Since the end portions 43 extend substantially along the axis of rotation, they will cooperate with the ribs 45 to prevent angular movement of the retaining member 27 regardless of the direction of rotation of the disk 26. Thus, the retaining member 37 is held against rotation with respect to the depending support 10, whether the disk 26 extends transversely to the left of the depending support 10 of the direction of movement through the ground or to the right.

Lubricant is applied through a lubricant nipple 50 secured to the depending support 10 in an enlarged end 51 of a lubricant passage 52. The passage 52 communicates with a groove 53 in the opening 19 in the bearing support 14 and in the enlargement 21 of the opening 19. The groove 53 communicates with a space 54 between the furrow disk 26 and the end face 25 of the radial flange 22. This space communicates with three grooves 55 in the frusto-conical surface 23 of the radial flange 22 of the bearing support 14. The grooves 55 are shown in Figure 3, and they in turn communicate with grooves 56 in the end face 24 of the flange 22. The grooves 56 communicate with a space 57 between the inner edge of the radial flange 30 of the rotatable member 27 and an adjacent portion of the bearing support 14. The space 57 communicates with a space 58 between the dished face 32 of the flange 30 of the rotatable bearing member 27 and the flat face 33 on the metal seal 34. Escape of lubricant in an outward direction from beyond a region of contact 59 between the bearing support 14 and the inner surface of the stationary member 34 is prevented by sealing contact of the resilient seal 36 with the end face 35 of the metal seal 34. Escape of lubricant in an axial direction is prevented by sealing contact of the inner peripheral surface of the resilient seal 36 with the bearing support 14. Sealing at this region is most important and is probably more difficult than sealing between the seals 34 and 36, since the resilient seal 36 may have some movement with respect to the bearing support 14.

Lubricant is, of course, supplied through the lubricant nipple 50 and passes through the passage 52, the groove 53, the space 54, and the grooves 55 and 56 into the spaces 57 and 58. Because the contacting end faces 32 and 33 on the rotatable member 27 in the metal seal 34 are, respectively, dished and flat, these surfaces contact only along a narrow region 60 outwardly of the space 58. This region 60 is, at the start, theoretically a line but, as wear progresses, has a measurable width. Lubricant may escape from the space 58 outwardly through the region of contact 60, since this contact is made only by metal parts that are formed of unyielding material and are resiliently held against one another by the yielding form of the spring pieces 42 on the retainer 37. However, a slight escape of lubricant is not disadvantageous. Since there is a definite space 58 defined by the flat surface face 33 and the dished face 32, there is considerable lubricant immediately inward of the region of contact 60 which prevents the entrance of extraneous material through the region of contact 60. It has been stated that the springing out of the pieces 42 on the retaining member 37 provides gripping engagement of the end portions 43 with the inner side 46 of the groove 44 from the depending support 10, causing the retaining member 37 to be held against movement transverse to the axis of rotation, and this in turn prevents such movement of the resilient seal 36 contained within the retaining ring 37. It is exceedingly advantageous to hold the resilient seal against such transverse movement, for when it is so held, its inner diameter remains constant, and thus there is maintained a good sealing relation between the inner side thereof and the bearing support 14. It is believed to be new, in a seal construction involving a metal or unyielding seal in sealing contact with a rotating part and a yielding seal formed of material such as felt or rubber, for the yielding seal to have its inner peripheral surface with a supporting member.

The pieces 42 struck from the flat end 39 of the retaining member 37 constitute resilient means which urge the resilient seal 36 against the metal seal 34 and the metal seal 34 against the rotatable member 27. Thus, there is a sufficient sealing maintained between the resilient seal 36 and the face 35 of the metal seal 34 and between the rotatable member 27 and the metal seal 34 at the region of contact 60. The notches 41 in the flange 40 of the stationary bearing member 34 cooperate with the projections 41ª on the retaining member 37 so that the retaining member 37 prevents rotation of the stationary bearing member 34. Since axially directed forces on the disk 26 will cause axial movement of both the metal seal 34 and the retainer 37, there is no wear at the notches 41 in the metal seal 40 and the projections 41a on the retainer 37 due to relative movement of these parts. Furthermore, any tendency of the metal seal 34 to tilt about locking projections 41a due to rotational forces on the metal seal 34 and so to provide a gap for dust to enter is avoided, because the locking projections 41a, being on the retainer 37, tilt with the metal seal 34.

Figure 2 shows the thickness of the packing member 36 to be sufficient to hold the stationary bearing member 34 out of contact with the retaining member 37 except for contact at the notches 41 and the projections 41a. However, the sealing member 36 may be compressed sufficiently so that there is contact between the circular portion 38 of the retaining member 37 and the stationary bearing member 34. Thus, the stationary bearing member is given the resilient support of the retaining member, and the resiliency of the pieces 42 struck from the retaining member 37 permits the stationary member 34 and the retaining member 37 to tilt somewhat upon changes in direction of pressure applied to the furrow disk 26.

It will be apparent from the foregoing description that a new and novel bearing and seal construction has been provided. This construction per se has novelty, and there is novelty in its application to a furrow opener. One point of novelty is the prevention of rotation of an unyielding seal by keying to a retaining member for a yielding seal member, the retaining member being resiliently mounted so that it tilts with the unyielding seal and thus prevents wear upon tilting due to relative movement of the parts and opening of the seal due to tilting. Another point of novelty is the supporting of a resilient seal in a retainer that is held against movement transverse to the axis of rotation. Another point of novelty is the provision of integral extensions upon a retainer for a resilient seal which serve not only to grip a support to prevent movement transverse to the axis of rotation and rotation itself but also to serve as a resilient means for urging the resilient seal contained in the retainer against any unyielding seal. Still another point of novelty is the shaping of contacting surfaces of an unyielding seal and a rotatable member in such a way that actual contact is provided only over an outermost region, and there is a substantial space inwardly of the outermost region for lubricant which will prevent the entrance of foreign material through the said narrow outermost region of contact. Another novel feature is provision of sealing contact between the support and an inner peripheral surface of the yielding seal.

Various parts such as the rotatable member 27, the metal seal 34, the resilient seal 36, and the retainer 37 have been described as members, and it should be evident that they may be also described as rings since they take this form. The member 27 and the sealing ring 34 are normally formed of metal, and thus they may be considered to be hard and unyielding. The sealing ring 36 has been stated to be formed of felt or rubber or any other suitable material that is resilient or yielding.

The intention is to limit the invention only within the scope of the appended claims.

What is claimed is:

1. In combination, a support having a bearing flange, a rotatable member of unyielding material rotatably bearing against the flange, a sealing ring of unyielding material having a face in sliding sealing contact with a face of the rotatable member, a sealing ring of yielding material having a face in sealing contact with the unyielding sealing ring and an inner peripheral surface in sealing contact with the support, the contacting faces of the rotatable member and the unyielding sealing ring being so shaped as to contact only at a radially outermost narrow region so as to provide radially inwardly thereof a wedge-shaped space between the faces for lubricant out to the actual region of contact to keep the contact region closed by lubricant and thus to prevent the entrance of foreign material from the exterior.

2. In combination, a support having a bearing portion, a rotatable member of unyielding material rotatably bearing against the bearing portion, a sealing ring member of unyielding material having a face in sliding sealing contact with a face of the rotatable member, the contacting faces of the members being so shaped as to contact only at a radially outermost narrow region so as to provide radially inwardly thereof a space between the members for lubricant out to the actual region of contact to keep the contact region closed by lubricant and thus to prevent the entrance of foreign material from the exterior, a sealing ring of yielding material having a face in sealing contact with the unyielding sealing ring member and an inner peripheral surface in sealing contact with the support, a retaining ring partially embracing the yielding sealing ring and having portions cooperating with portions of the unyielding sealing ring member to prevent relative rotation therebetween, and resilient means acting between the support and the retaining ring to prevent rotation of the retaining ring with respect to the support and to urge the yielding sealing ring against the unyielding sealing ring member and the unyielding sealing ring member against the rotatable member.

3. In combination, a support having a bearing flange, a rotatable disk opener adjacent the flange, a member secured to the disk opener and rotatably bearing against the bearing flange, an unyielding sealing ring mounted upon the support and having sliding sealing contact with the member, a yielding sealing ring having a face in sealing contact with the unyielding sealing ring and an inner peripheral surface in sealing contact with the support, a retaining ring holding the yielding sealing ring and having portions cooperating with portions on the unyielding sealing ring to prevent relative rotation of the retaining ring and the unyielding sealing ring, and resilient means urging the yielding sealing ring against the unyielding sealing ring and the unyielding sealing ring against the member.

THOMAS L. CALLAHAN.
JAY WEAVER.